United States Patent
Kimoto et al.

(10) Patent No.: US 8,692,892 B2
(45) Date of Patent: Apr. 8, 2014

(54) COMMUNICATION APPARATUS AND CONTROL METHOD USED FOR TRANSMITTING VIDEO DATA TO AN EXTERNAL APPARATUS

(75) Inventors: Tatsuya Kimoto, Tokyo (JP); Isao Abe, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 12/505,356

(22) Filed: Jul. 17, 2009

(65) Prior Publication Data

US 2010/0020183 A1  Jan. 28, 2010

(30) Foreign Application Priority Data

Jul. 22, 2008  (JP) .................................. 2008-188859

(51) Int. Cl.
*H04N 5/225* (2006.01)

(52) U.S. Cl.
USPC ................. 348/207.11; 348/211.11

(58) Field of Classification Search
None
See application file for complete search history.

(56) References Cited

U.S. PATENT DOCUMENTS

| | | | |
|---|---|---|---|
| 2002/0101515 A1* | 8/2002 | Yoshida et al. | 348/211 |
| 2005/0027993 A1* | 2/2005 | Yanagisawa | 713/189 |
| 2006/0026318 A1* | 2/2006 | Lee | 710/72 |
| 2006/0095623 A1* | 5/2006 | Nio et al. | 710/260 |
| 2007/0057931 A1* | 3/2007 | Takamori | 345/204 |
| 2007/0283071 A1 | 12/2007 | Konishi | |
| 2008/0158216 A1* | 7/2008 | Kuroda | 345/211 |
| 2008/0180551 A1* | 7/2008 | Koike | 348/231.99 |
| 2009/0157885 A1* | 6/2009 | Takatsuji et al. | 709/228 |
| 2009/0237561 A1* | 9/2009 | Kobayashi | 348/554 |
| 2010/0269137 A1* | 10/2010 | Nakajima et al. | 725/39 |

FOREIGN PATENT DOCUMENTS

| | | | |
|---|---|---|---|
| JP | 2007202115 A * | 8/2007 | |
| JP | 2007-329594 A | 12/2007 | |
| JP | 2008-167367 A | 7/2008 | |
| WO | 2005/015901 A1 | 2/2005 | |
| WO | WO 2007049556 A1 * | 5/2007 | |
| WO | WO 2008-056708 A * | 5/2008 | |

OTHER PUBLICATIONS

HDMI Licensing, LLC, "High Definition Multimedia Interface, Specification Version 1.3a", published Nov. 10, 2006.*
"PI3HDMI431AR for Video Application", Pericom Semiconductor Corp., May 31, 2007.*
Carter, "The nuts and bolts of HDCP", EE Times, Feb. 20, 2008.*

* cited by examiner

*Primary Examiner* — Lin Ye
*Assistant Examiner* — Dennis Hogue
(74) *Attorney, Agent, or Firm* — Canon USA, Inc. IP Division

(57) ABSTRACT

An image capture apparatus includes: a communication unit and a control unit. The communication unit communicates with an external apparatus via a first transmission line and a second transmission line. The control unit determines whether or not the communication unit is in a predetermined state, in a case where the operation mode of the image capture apparatus changed to either a playback mode or an image capture mode. The control unit does not execute a connecting process in a case where the communication unit is in the predetermined state.

17 Claims, 4 Drawing Sheets

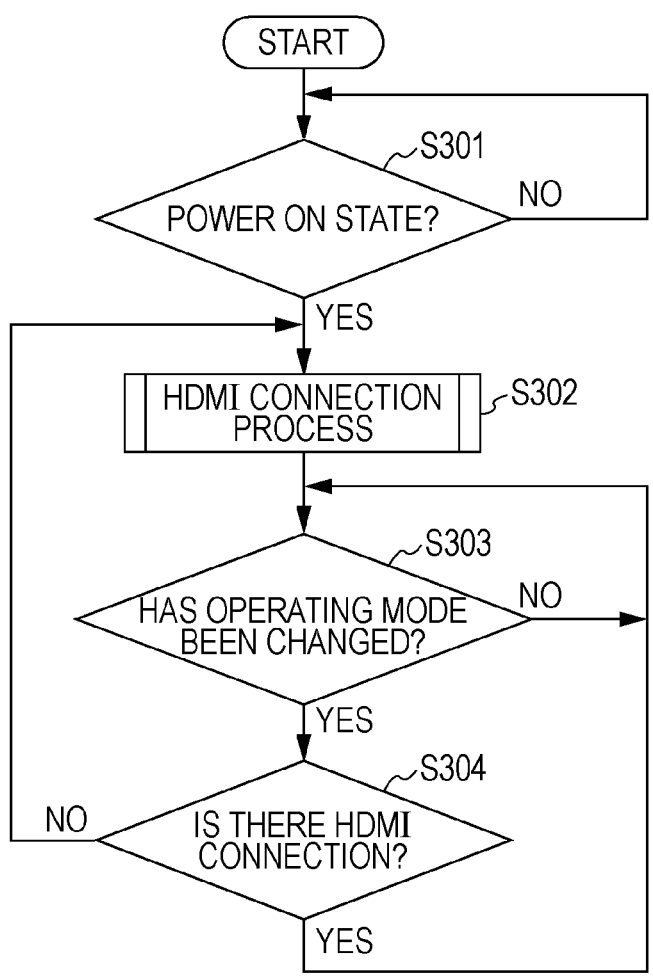

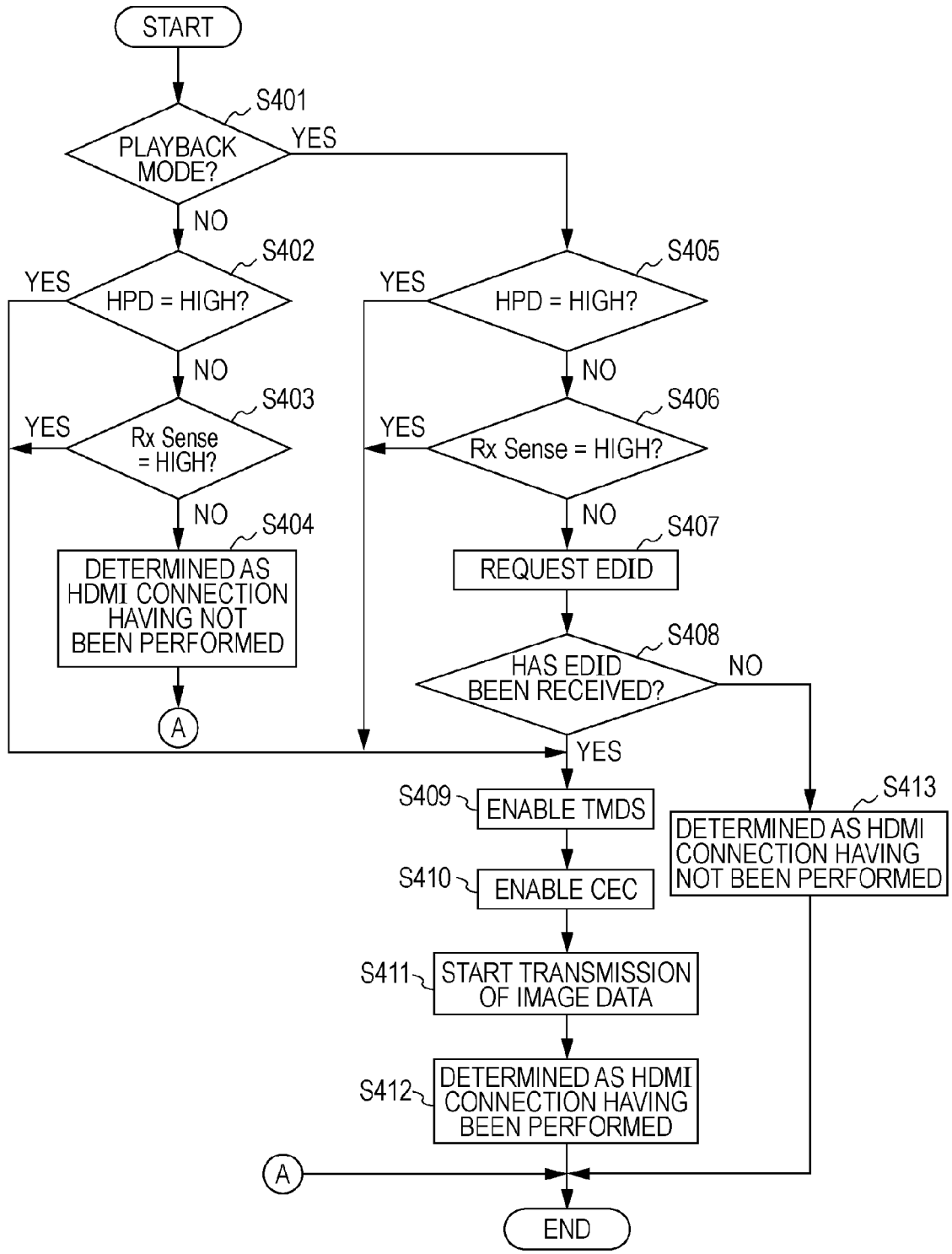

COMMUNICATION APPARATUS AND CONTROL METHOD USED FOR TRANSMITTING VIDEO DATA TO AN EXTERNAL APPARATUS

BACKGROUND OF THE INVENTION

1. Field of the Invention

The present invention relates to a communication apparatus used for transmitting video data to an external apparatus, and a method of the communication apparatus.

2. Description of the Related Art

There has been known a communication system which connects a communication apparatus which transmits video data, and an external apparatus via the HDMI (High Definition Multimedia Interface) (registered trademark) (see Japanese Patent Laid-Open No. 2007-329594).

With HDMI, the communication apparatus operates as an HDMI source, and the external apparatus operates as an HDMI sink. The HDMI source can detect whether or not the HDMI source and the HDMI sink are connected, by using an HPD (Hot Plug Detect) signal to be transmitted from the HDMI sink to the HDMI source.

An existing communication system has detected whether or not the HDMI source and the HDMI sink are connected, by using an HPD signal. Therefore, in a case where no HPD signal has been detected, determination is made that the HDMI source and the HDMI sink are not connected, and consequently, resulting in a problem wherein the HDMI connection fails to be established between the HDMI source and the HDMI sink.

Also, with an existing communication system, even in a case where the operation mode of the HDMI source has been changed, determination may be made whether or not the HDMI source and the HDMI sink are connected by using an HPD signal. In a case where determination is made that the HDMI source and the HDMI sink are connected after the operation mode of the HDMI source has been changed, the HDMI source starts process used for establishing the HDMI connection between the HDMI source and the HDMI sink again. In this case, the HDMI source has to interrupt transmission of video data to the HDMI sink, and reception of a CEC command from the HDMI sink over a long duration, and consequently, there is a possibility that a problem will occur wherein change of the operation mode of the HDMI source is not executed smoothly.

SUMMARY OF THE INVENTION

The present invention is directed to overcome the above-mentioned drawbacks and disadvantages. To this end, the present invention enables to determine whether or not a communication apparatus (HDMI source) and an external apparatus (HDMI sink) are connected even in a case where no HPD signal has been detected. Also, the present invention enables change of the operation mode of the communication apparatus (HDMI source) to be executed smoothly.

According to an aspect of the present invention, there is provided an image capture apparatus including: a communication unit that communicates with an external apparatus via a first transmission line and a second transmission line, the first transmission line being used to transmit video data, the second transmission line being used to transmit a control command; and a control unit that determines whether or not the communication unit is in a predetermined state, in a case where the operation mode of the image capture apparatus is changed to one of a playback mode and an image capture mode; wherein the predetermined state being a state in which the communication unit can transmit the control command to the external apparatus via the second transmission line; and wherein the control unit does not execute a connecting process, in a case where the communication unit is in the predetermined state; and wherein the connecting process being used to enable the communication unit to communicate with the external apparatus via the second transmission line; and wherein the control unit executes the connecting process, in a case where the communication unit is not in the predetermined state.

According to an aspect of the present invention, there is provided a method of controlling an image capture apparatus, the image capture apparatus including a communication unit that communicates with an external apparatus via a first transmission line and a second transmission line, the first transmission line being used to transmit video data, the second transmission line being used to transmit a control command, the method comprising: determining whether or not the communication unit is in a predetermined state, in a case where the operation mode of the image capture apparatus is changed to one of a playback mode and an image capture mode, wherein the predetermined state being a state in which the communication unit can transmit the control command to the external apparatus via the second transmission line; not executing a connecting process, in a case where the communication unit is in the predetermined state, wherein the connecting process being used to enable the communication unit to communicate with the external apparatus via the second transmission line; and executing the connecting process, in a case where the communication unit is not in the predetermined state.

Further features and aspects of the present invention will become apparent from the following description of exemplary embodiments with reference to the attached drawings.

BRIEF DESCRIPTION OF THE DRAWINGS

FIG. 3 is a flowchart illustrating an example of processing executed by a communication apparatus according to the first exemplary embodiment of the present invention.

FIG. 4 is a flowchart illustrating an example of HDMI connecting processing executed by the communication apparatus according to the first exemplary embodiment of the present invention.

DESCRIPTION OF THE EMBODIMENTS

Various exemplary embodiments, features, and aspects of the present invention will now be described in detail below with reference to the attached drawings.

First Embodiment

Figure 1:
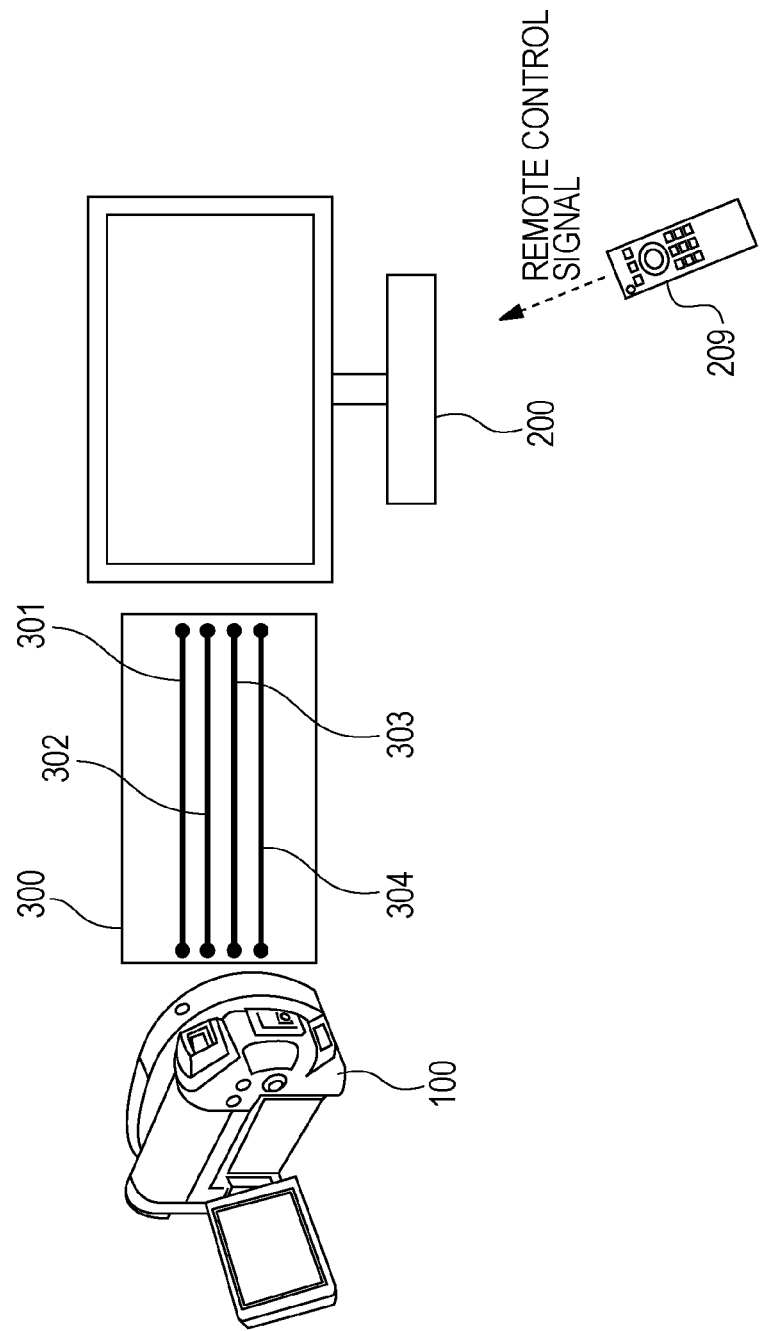
FIG. 1 is a diagram illustrating an example of a communication system according to a first exemplary embodiment of the present invention.
Figure 2:
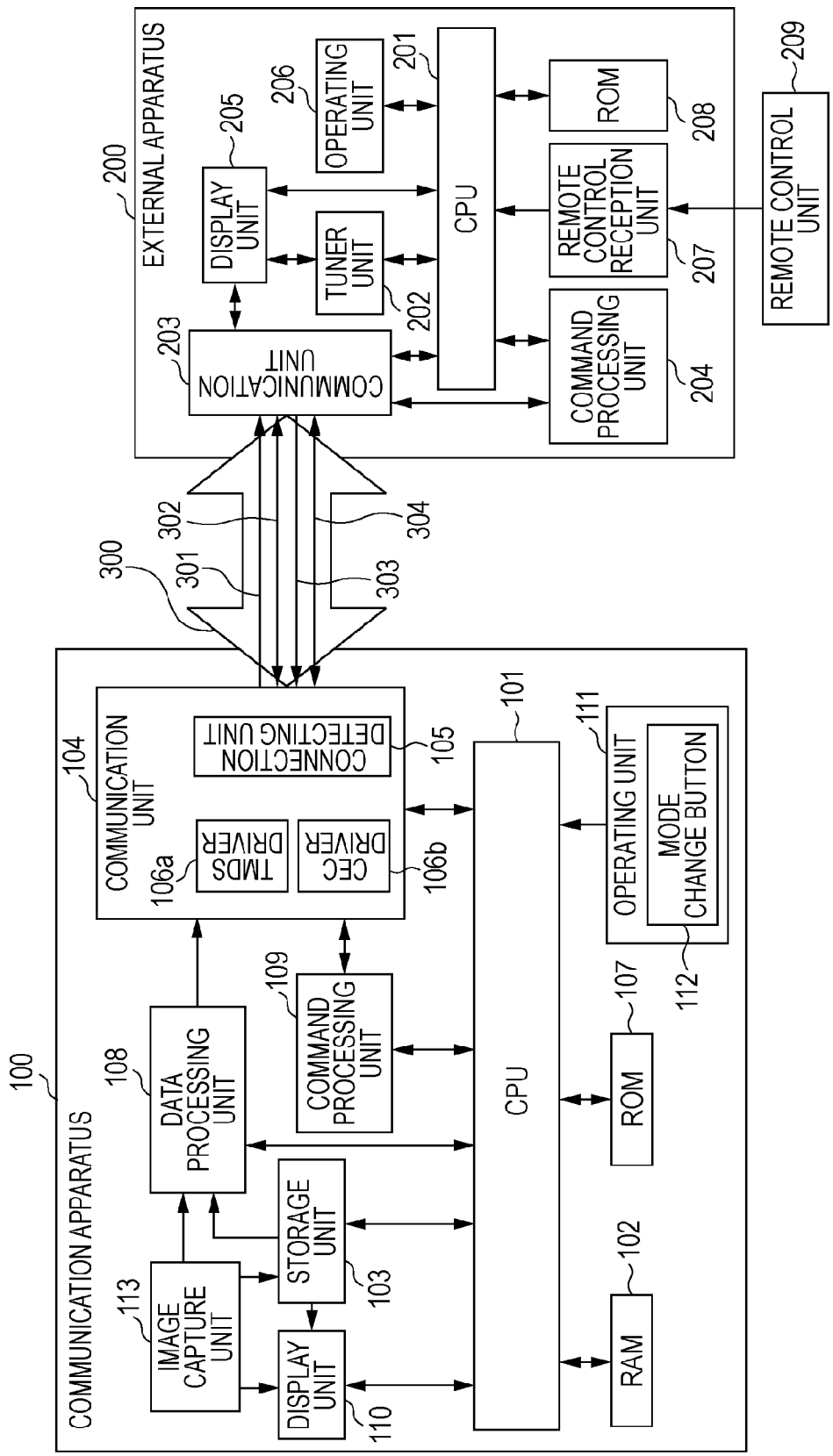
FIG. 2 is a block diagram illustrating an example of the schematic configuration of the communication systems according to the first exemplary embodiment of the present invention.

The communication system according to a first embodiment includes, as shown in FIGS. 1 and 2, a communication apparatus 100, a connection cable 300, an external apparatus 200, and a remote control unit 209. The communication apparatus 100 and the external apparatus 200 are connected via the connection cable 300. The external apparatus 200 and the remote control unit 209 are connected via wireless communication.

The communication apparatus 100 is a video source that can transmit video data, audio data, and auxiliary data to the external apparatus 200 via the connection cable 300. The external apparatus 200 is an external display apparatus that displays the video data transmitted from the communication apparatus 100 on a display, and outputs the audio data transmitted from the communication apparatus 100 from speakers. The communication apparatus 100 and the external apparatus 200 can transmit various control commands bidirectionally via the connection cable 300.

The remote control unit 209 is a user interface used for operating the communication apparatus 100 and the external apparatus 200. The remote control unit 209 is configured such that it is capable of communicating with the external apparatus 200 via wireless communication, but incapable of communicating with the communication apparatus 100 via wireless communication.

With the first embodiment, a video camera is used as an example of the communication apparatus 100, and a television receiving apparatus (hereafter, referred to as "television") is used as an example of the external apparatus 200. Also, with the first embodiment, a connection cable that conforms to the High Definition Multimedia Interface (HDMI) standard is used as an example of the connection cable 300. The connection cable that conforms to the HDMI standard is hereinafter referred to as "HDMI cable".

Next, the HDMI cable 300 will be described. The HDMI cable 300 includes a Transition Minimized Differential Signaling (TMDS) (registered trademark) line 301, and a Consumer Electronics Control (CEC) line 302. Also, the HDMI cable 300 includes a Hot Plug Detect (HPD) line 303, a Display Data Channel (DDC) line 304, and a power supply line.

The TMDS line 301 (first transmission line) is a transmission line used for transmitting the video data, the audio data, and the auxiliary data to the television 200 from the video camera 100. The TMDS line 301 includes a TMDS channel 0, TMDS channel 1, TMDS channel 2, and TMDS clock channel. The CEC line 302 (second transmission line) is a transmission line used for bidirectionally transmitting various control commands between the video camera 100 and the television 200. The HPD line 303 is a transmission line used for transmitting a HPD signal to the video camera 100 from the television 200. The DDC line 304 is a transmission line used for transmitting Extended Display Identification Data (EDID) to the video camera 100 from the television 200. The EDID includes information on capability such as display capability of the television 200. The power supply line is a line that supplies power to the television 200 from the video camera 100.

The video camera 100 operates as an HDMI source defined by the HDMI standard, and the television 200 operates as an HDMI sink defined by the HDMI standard. Also, the video camera 100 and the television 200 are both HDMI apparatuses that conform to the CEC standard. The CEC is a control protocol defined by the HDMI standard. Hereafter, a control command to be transmitted between the video camera 100 and the television 200 via the CEC line 302 will hereinafter be referred to as a "CEC command". The television 200 can control the video camera 100 by transmitting a CEC command used for controlling the video camera 100 to the video camera 100 via the CEC line 302. The video camera 100 can also control the television 200 by transmitting a CEC command used for controlling the television 200 to the television 200 via the CEC line 302. CEC commands used for controlling the video camera 100 are, for example, a power on command and a power off command as commands controlling the power of the video camera 100. Further, the CEC command is, for example, a playback command, a stop command, a pause command, a fast forward command, a rewind command, a recording command, a recording pause command, a menu on command, a menu off command, and so forth.

Note that the connection cable 300 is not restricted to the HDMI cable. If a connection cable 300 can be any connection cable other than the HDMI cable separately includes a line used for transmitting video data, audio data, and auxiliary data, and a line used for bidirectionally transmitting various control commands between the communication apparatus 100 and the external apparatus 200, the connection cable may be used.

Next, an example of the configuration of the video camera 100 will be described. The video camera 100 includes, as shown in FIG. 2, a CPU 101, RAM 102, a recording unit 103, a communication unit 104, ROM 107, a data processing unit 108, a command processing unit 109, a display unit 110, an operating unit 111, and an image capture unit 113.

The video camera 100 has an operation mode such as an image capture mode, playback mode, or the like. In a case where the operation mode of the video camera 100 is the image capture mode, the video camera 100 can capture an image of an object, and can record an image captured video (any one of a moving image and a still image) in a recording medium. In a case where the operation mode of the video camera 100 is the playback mode, the video camera 100 can reproduce the video (any one of a moving image and a still image) selected by the user from the recording medium.

The CPU (Central Processing Unit) 101 controls the operation of the video camera 100 in accordance with a computer program stored in the ROM 107. The RAM 102 is memory that functions as a work area of the CPU 101, and is the memory used for storing various values, data, and information used by the CPU 101. The CPU 101 acquires information relating to the television 200 from the television 200 via the HDMI cable 300, and stores the acquired information in the RAM 102. The information stored in the RAM 102 is, for example, a globally unique identifier (GUID), which is a unique identifier of the television 200, the EDID of the television 200, and so forth. Note that the work area of the CPU 101 is not limited to the RAM 102, and an external storage unit such as a hard disk apparatus can be used.

In a case where the operation mode of the video camera 100 is the image capture mode, the image capture unit 113 senses an object and generates video data from an optical video of the object thereof. The video data generated by the image capture unit 113 is supplied to the recording unit 103, the display unit 110, and the data processing unit 108. Audio data generated by a microphone unit (not shown) will also be supplied to the recording unit 103 and the data processing unit 108.

In a case where the operation mode of the video camera 100 is the image capture mode, the recording unit 103 can record the video data generated by the image capture unit 113 and the audio data generated by the microphone unit (not shown), in the recording medium.

Also, in a case where the operation mode of the video camera 100 is the playback mode, the recording unit 103 can reproduce the video data and audio data selected by the user from the recording medium. The video data reproduced from the recording medium is supplied to the display unit 110 and the data processing unit 108. On the other hand, the audio data reproduced from the recording medium is supplied to the data processing unit 108 and a speaker unit (not shown).

Note that the recording medium used by the recording unit 103 can be either a recording medium integrated in the video camera 100, or a recording medium removable from the video camera 100.

The communication unit 104 includes an HDMI terminal used for connecting the HDMI cable 300. In a case where the video camera 100 is the image capture mode, the communication unit 104 transmits the video data generated by the image capture unit 113, the audio data generated by the microphone unit (not shown), and the auxiliary data generated by the CPU 101 to the television 200 via the TMDS line 301. In a case where the operation mode of the video camera 100 is the playback mode, the communication unit 104 transmits the video data and audio data that the recording unit 103 reproduced from the recording medium, and the auxiliary data generated by the CPU 101 to the television 200 via the TMDS line 301.

Also, the communication unit 104 includes a connection detecting unit 105, a TMDS driver 106a, and a CEC driver 106b. The connection detecting unit 105 has a function used for determining whether the HPD signal transmitted from the television 200 to the video camera 100 is high or low, and a function used for determining whether a later described Rx Sense is high or low. Also, the connection detecting unit 105 has a function used for determining whether the EDID of the television 200 has been received from the television 200 via the DDC line 304.

The TMDS driver 106a is a controller used for controlling the TMDS line 301. When the video camera 100 and the television 200 are disconnected via the HDMI cable 300, the TMDS driver 106a is in a low power consumption state. In the case of receiving a TMDS enable signal from the CPU 101, the TMDS driver 106a changes to a normal state from a low power consumption state. In this case, the TMDS driver 106a enables the TMDS line 301. In a case where the TMDS line 301 has been enabled, the communication unit 104 can transmit the video data, the audio data, and the auxiliary data to the television 200 via the TMDS line 301.

In the case of receiving a TMDS disable signal from the CPU 101, the TMDS driver 106a changes to a low power consumption state from a normal state. In this case, the TMDS driver 106a disables the TMDS line 301. In a case where the TMDS line 301 has been disabled, the communication unit 104 fails to transmit the video data, the audio data, and the auxiliary data to the television 200 via the TMDS line 301, but the power consumption of the communication unit 104 is reduced.

The CEC driver 106b is a controller used for controlling the CEC line 302. When the video camera 100 and the television 200 are disconnected via the HDMI cable 300, the CEC driver 106b is in a low power consumption state. In the case of receiving a CEC enable signal from the CPU 101, the CEC driver 106b changes to a normal state from a low power consumption state. In this case, the CEC driver 106b enables the CEC line 302. In a case where the CEC line 302 has been enabled, the communication unit 104 can receive a CEC command used for controlling the video camera 100 from the television 200, and can also transmit a CEC command used for controlling the television 200 to the television 200.

In the case of receiving a CEC disable signal from the CPU 101, the CEC driver 106b changes to a low power consumption state from a normal state. In this case, the CEC driver 106b disables the CEC line 302. In a case where the CEC line 302 has been disabled, the communication unit 104 cannot receive a CEC command used for controlling the video camera 100 from the television 200, and also cannot transmit a CEC command used for controlling the television 200 to the television 200.

Also, the communication unit 104 can receive the CEC command from the television 200 via the CEC line 302. In the case of receiving the CEC command from the television 200, the communication unit 104 supplies the received CEC command to the CPU 101 via the command processing unit 109.

Also, the communication unit 104 can also transmit a CEC command used for controlling the television 200 to the television 200 via the CEC line 302. A CEC command used for controlling the television 200 is generated by the CPU 101, and is supplied to the communication unit 104 via the command processing unit 109.

In a case where the operation mode of the video camera 100 is the image capture mode, the data processing unit 108 supplies the video data generated by the image capture unit 113, the audio data generated by the microphone unit (not shown), and the auxiliary data supplied from the CPU 101, to the communication unit 104. In a case where the operation mode of the video camera 100 is the playback mode, the data processing unit 108 supplies the video data and the audio data that the recording unit 103 reproduced from the recording medium, and the auxiliary data supplied from the CPU 101, to the communication unit 104.

The display unit 110 includes a liquid crystal display. In a case where the operation mode of the video camera 100 is the image capture mode, the display unit 110 displays the video data generated by the image capture unit 113. In a case where the operation mode of the video camera 100 is the playback mode, the display unit 110 displays the video data reproduced by the recording unit 103 from the recording medium.

Further, if the video camera 100 is in the mute state, the display unit 110 displays the mute image stored in the ROM 107. According to the first embodiment, the mute image is video data that indicates that the mute procedure is being executed. The mute image is, for example, a black back video (a video of which the background color is black) or blue back video (a video of which the background color is blue). An icon and character information that indicates that the mute process is being executed may be included in the mute image. Note that, with the first embodiment, an arrangement has been made wherein, in a case where the display unit 110 is in the mute state, the mute image stored in the ROM 107 is displayed on the display unit 110, but the display on the display unit 110 is not limited to this. In a case where the display unit 110 is in the mute state, nothing may be displayed on the display unit 110.

The operating unit 111 is a user interface used for operating the video camera 100, and includes a plurality of buttons used for operating the video camera 100. The instruction given by the user is sent to the CPU 101 via the operating unit 111. Each button included in the operating unit 111 is configured by a switch, or a touch panel.

The operating unit 111 includes a power button, start/stop button, a mode change button 112, a menu button, a + button, a – button, a SET button, and so forth. Note that the + button and the – button may be replaced with a D-pad.

The power button is a button used for instructing the CPU 101 to change the state of the video camera 100 to a power on state or a power off state. The power on state is a state in which power can be supplied to the whole of the video camera 100 from a power source (not shown) such as a battery, or an AC power source. The power off state is a state in which supply of power to a part of the video camera 100 or the whole of the video camera 100 from the power source is stopped.

The start/stop button is a button used for instructing the CPU 101 to start or temporarily stop recording of the video data which has been generated by the image capture unit 113 to the recording medium. The mode change button 112 is a button used for instructing the CPU 101 to change the operation mode of the video camera 100 to such as the image capture mode or the playback mode.

The menu button is a button used for instructing the CPU 101 to display or hide a menu screen of the video camera 100. The menu screens of the video camera 100 include a menu screen used for controlling the video camera 100, and a menu screen used for changing the settings of the video camera 100. These menu screens are stored in the ROM 107.

In the case of displaying a menu screen, the CPU 101 reads out the menu screen to be displayed from the ROM 107, and supplies the menu screen that has been read out to the display unit 110 and the data processing unit 108. At this time, the CPU 101 superposes a cursor on the menu screen. The display unit 110 and the data processing unit 108 superpose the menu screen supplied from the CPU 101 on the video data supplied from the image capture unit 113 or the recording unit 103. Thus, the same menu screen is displayed on the display unit 110 and the television 200. In the case of not displaying the menu screen, the CPU 101 stops the supply of the menu screen to the display unit 110 and the data processing unit 108.

The + button and the − button are buttons used for moving the cursor on the menu screen. The SET button is a button used for instructing the CPU 101 to execute the item selected by the cursor. The + button, the − button, and the SET button are also used in changing the menu screen.

Also, the operating unit 111 includes a playback button, a stop button, a pause button, a fast forward button, a rewind button, and so forth. These buttons are buttons used for instructing the CPU 101 to execute the playback, the stop, the pause, the fast forward, and the rewind operations of the video data recorded in the recording medium.

As described above, the mute image and the menu screens are stored in the ROM 107. A plurality of icons used for informing the user of the state of the video camera 100 are also stored in the ROM 107. Also, a computer program used for controlling the operation of the video camera 100 is also stored in the ROM 107.

Note that the communication apparatus 100 is not restricted to a video camera. For example, the communication apparatus 100 can be an image capture apparatus such as a video camera, a still camera, a cell phone with camera, or the like.

Next, an example of the configuration of the television 200 will be described. The television 200 includes, as shown in FIG. 2, a CPU 201, a tuner unit 202, a communication unit 203, a command processing unit 204, a display unit 205, an operating unit 206, a remote control reception unit 207, and ROM 208. The CPU (Central Processing Unit) 201 controls the operation of the television 200 in accordance with a computer program stored in the ROM 208.

The tuner unit 202 receives an analog television broadcasting, a digital television broadcasting, or a cable television broadcasting in accordance with the selection by the user. The television broadcasting that the tuner unit 202 receives can be selected from a remote control unit 209. The television channel that the tuner unit 202 receives can also be selected from the remote control unit 209. The video data included in the analog television broadcasting, the digital television broadcasting, or the cable television broadcasting is displayed on the display unit 205. Also, the audio data included in the analog television broadcasting, the digital television broadcasting, or the cable television broadcasting can be output from a speaker unit (not shown).

The communication unit 203 includes a HDMI terminal used for connecting the HDMI cable 300. The communication unit 203 can receive the video data, the audio data, and the auxiliary data transmitted from the video camera 100 via the TMDS line 301. The video data transmitted from the video camera 100 is displayed on the display unit 205. The audio data transmitted from the video camera 100 is output from the speaker unit (not shown). Also, the auxiliary data transmitted from the video camera 100 is supplied to the CPU 201.

Also, the communication unit 203 can receive the CEC command from the video camera 100 via the CEC line 302. In the case of receiving the CEC command from the video camera 100, the communication unit 203 supplies the received CEC command to the CPU 201 via the command processing unit 204.

Also, the communication unit 203 can also transmit a CEC command used for controlling the video camera 100 to the video camera 100 via the CEC line 302. A CEC command used for controlling the video camera 100 is generated by the CPU 201, and is supplied to the communication unit 203 via the command processing unit 204.

The communication unit 203 receives the CEC command from the video camera 100 via the CEC line 302. The CEC command sent from the video camera 100 is supplied from the communication unit 203 to the CPU 201 via the command processing unit 204.

A CEC command used for controlling the video camera 100 is generated by the CPU 201, and is supplied to the communication unit 203 via the command processing unit 204. The CEC command used for controlling the video camera 100 is supplied from the command processing unit 204 to the communication unit 203, and is transmitted to the video camera 100 via the CEC line 302.

The display unit 205 includes a display device such as a liquid crystal display or the like. The display unit 205 can display the video data supplied from either the tuner unit 202 or the communication unit 203. The display unit 205 can also display the mute image stored in the ROM 208.

The operating unit 206 is a user interface used for operating the television 200. Also, the operating unit 206 includes, similar to the remote control unit 209, a plurality of buttons used for operating the television 200. Each button included in the operating unit 206 is configured by a switch, touch panel, or the like.

In the case of receiving the remote control signal transmitted from the remote control unit 209, the remote control reception unit 207 supplies the received remote control signal to the CPU 201. Thus, the instruction by the user is input to the CPU 201 via the remote control unit 209 and the remote control reception unit 207. The CPU 201 generates the CEC command corresponding to the remote control signal from the remote control reception unit 207, and supplies the generated CEC command to the communication unit 203 via the command processing unit 204. The CEC command supplied to the communication unit 203 is transmitted to the video camera 100 via the CEC line 302. Thus, the user can control the video camera 100 by using the remote control unit 209.

As described above, the mute image, and menu screens are stored in the ROM 208. The plurality of icons used for informing the user of the state of the television 200, and the EDID of the television 200, and so forth are also stored in the ROM 208. Also, the computer program used for controlling the operation of the television 200 is also stored in the ROM 208.

The remote control unit 209 is a user interface used for operating the video camera 100 and the television 200, and includes a plurality of buttons used for operating the video camera 100, and a plurality of buttons used for operating the television 200. Each button included in the remote control unit 209 is configured of a switch, or a touch panel, or the like.

Note that the external apparatus 200 is not limited to a television receiving apparatus. For example, the external apparatus 200 may be a personal computer having a display.

Next, process executed by the video camera 100 according to the first embodiment will be described with reference to FIGS. 1 through 4. FIG. 3 is a flowchart illustrating an example of process executed by the video camera 100 according to the first embodiment. Note that the flowchart shown in FIG. 3 is controlled by the CPU 101 executing the computer program stored in the ROM 107.

In step S301, the CPU 101 determines whether or not the video camera 100 is in a power on state.

In a case where the video camera 100 is in a power on state (YES in step S301), the process proceeds to step S302 from step S301. In a case where the video camera 100 is in a power off state (NO in step S301), the process returns to step S301 from step S301.

In step S302, the CPU 101 starts HDMI connecting process. With the HDMI connecting process, process used for establishing the HDMI connection is executed between the video camera 100 and the television 200. In a case where the HDMI connection could have been established between the video camera 100 and the television 200, the CPU 101 changes the value of an HDMI connection flag included in the RAM 102 to "1". In a case where the HDMI connection has not been established between the video camera 100 and the television 200, the CPU 101 changes the value of the HDMI connection flag included in the RAM 102 to "0". Note that the HDMI connecting process performed in step S302 will be described later with reference to FIG. 4.

In step S303, the CPU 101 determines whether or not the operation mode of the video camera 100 has been changed to either the image capture mode or the playback mode. The user operates the mode change button 112 included in the operating unit 111, whereby the user can change the operation mode of the video camera 100 to the image capture mode or the playback mode.

In a case where the operation mode of the video camera 100 has been changed (YES in step S303), the process proceeds to step S304 from step S303. In a case where the operation mode of the video camera 100 has not been changed (NO in step S303), the process returns to step S303 from step S303.

In step S304, the CPU 101 determines whether or not the HDMI connection has already been established between the video camera 100 and the television 200. In a case where the value of the HDMI connection flag included in the RAM 102 is "1", the CPU 101 determines that the HDMI connection has already been established. In a case where the value of the HDMI connection flag included in the RAM 102 is "0", the CPU 101 determines that the HDMI connection has not been established.

In a case where determination is made that the HDMI connection has already been established, the CPU 101 starts the initializing process corresponding to the operation mode after change. At this time, the CPU 101 executes control so as not to execute the HDMI connecting process in step S302. Thus, the process used for determining whether or not the video camera 100 and the television 200 are connected is not executed, whereby the video camera 100 can rapidly resume transmission of video data to the television 200, or reception of a CEC command from the television 200.

In a case where determination is made that the HDMI connection has already been established (YES in step S304), the present flowchart returns to step S303 from step S304.

In a case where determination is made that the HDMI connection has not been established (NO in step S304), the process returns to step S302 from step S304. In this case, in step S302 the HDMI connecting process is executed.

FIG. 4 is a flowchart illustrating an example of the HDMI connecting process executed in step S302 in FIG. 3. In FIG. 4, process in steps S401 through S404 and S409 through S412 will be referred to as "first connecting process", and process in steps S405 through S413 will be referred to as "second connecting process". Note that the flowchart shown in FIG. 4 is controlled by the CPU 101 executing the computer program stored in the ROM 107.

In step S401, the CPU 101 determines whether or not the operation mode of the video camera 100 is the playback mode. In a case where the operation mode of the video camera 100 is the image capture mode, the CPU 101 starts the first connecting process, and in a case where the operation mode of the video camera 100 is the playback mode, starts the second connecting process.

In a case where the operation mode of the video camera 100 is the playback mode (YES in step S401), the process proceeds to step S405 from step S401. In a case where the operation mode of the video camera 100 is the image capture mode (NO in step S401), the process proceeds to step S402 from step S401.

In step S402, the CPU 101 determines whether or not the video camera 100 and the television 200 are connected, in accordance with a first connection detecting method.

The first connection detecting method is a method used for detecting connection between the video camera 100 and the television 200 by using the HPD signal transmitted from the television 200 to the video camera 100. The connection detecting unit 105 determines whether the HPD signal transmitted from the television 200 to the video camera 100 is high or low. The determination results of the connection detecting unit 105 are supplied to the CPU 101, whereby the CPU 101 can know that the HPD signal is high or low. In a case where the HPD signal is high, the CPU 101 determines that the video camera 100 and the television 200 are connected. In a case where the HPD signal is low, the CPU 101 determines that the video camera 100 and the television 200 are disconnected.

In a case where determination is made that the video camera 100 and the television 200 are connected (YES in step S402), the process proceeds to step S409 from step S402. In a case where determination is made that the video camera 100 and the television 200 are disconnected (NO in step S402), the process proceeds to step S403 from step S402.

In step S403, the CPU 101 determines whether or not the video camera 100 and the television 200 are connected, in accordance with the second connection detecting method.

The second connection detecting method is a method used for detecting connection between the video camera 100 and the television 200 by using Rx Sense (or Receiver Sense). The Rx Sense is a function used for the communication unit 104 which is an HDMI transmitter detecting whether or not there is the communication unit 203 which is a HDMI receiving apparatus. For example, the communication unit 104 can detect whether or not there is the communication unit 203 by detecting whether or not the response signal corresponding to a predetermined clock signal can be received. In this case, the communication unit 104 transmits a predetermined clock signal to the television 200 via the TMDS line 301, and determines whether or not the response signal corresponding to the clock signal thereof could have been received from the television 200 via the DDC line 304. Subsequently, in a case where the response signal could have been received, the communication unit 104 detects that there is the communication unit 203, and in a case where the response signal could not have been received, the communication unit 104 detects that there is no communication unit 203. Also, the communication unit 104 can also detect whether or not there is the communication unit 203, by using the termination voltage of the TMDS line 301.

In a case where detection is made that there is the HDMI receiving apparatus, the communication unit 104 sets the Rx Sense to high, and in a case where detection is made that there is no HDMI receiving apparatus, the communication unit 104 sets the Rx Sense to low. The connection detecting unit 105 determines whether the Rx Sense is high or low. The determination results of the connection detecting unit 105 are supplied to the CPU 101, whereby the CPU 101 can know whether the Rx Sense is high or low. In a case where the Rx Sense is high, the CPU 101 determines that the video camera 100 and the television 200 are connected. In a case where the Rx Sense is low, the CPU 101 determines that the video camera 100 and the television 200 are disconnected.

In a case where determination is made that the video camera 100 and the television 200 are connected (YES in step S403), the process proceeds to step S409 from step S403. In a case where determination is made that the video camera 100 and the television 200 are disconnected (NO in step S403), the process proceeds to step S404 from step S403.

In step S404, the CPU 101 determines that the HDMI connection could not have been established between the video camera 100 and the television 200, and changes the value of the HDMI connection flag included in the RAM 102 to "0". In this case, the video camera 100 and the television 200 are in an unconnected state. Subsequently, the process proceeds from step S404 to step S303 in FIG. 3.

Note that the value of the HDMI connection flag within the RAM 102 is reset to "0" when setting the video camera 100 to a power off state.

In step S405, the CPU 101 determines whether or not the video camera 100 and the television 200 are connected, in accordance with the above mentioned first connection detecting method.

In a case where determination is made that the video camera 100 and the television 200 are connected YES in step S405), the process proceeds to step S409 from step S405. In a case where determination is made that the video camera 100 and the television 200 are disconnected (NO in step S405), the process proceeds to step S406 from step S405.

In step S406, the CPU 101 determines whether or not the video camera 100 and the television 200 are connected, in accordance with the above mentioned second connection detecting method.

In a case where determination is made that the video camera 100 and the television 200 are connected (YES in step S406), the process proceeds to step S409 from step S406. In a case where determination is made that the video camera 100 and the television 200 are disconnected (NO in step S406), the process proceeds to step S407 from step S406.

In step S407, the CPU 101 transmits an EDID request signal used for requesting EDID to the television 200 via the DDC line 304. In a case where the television 200 could have received the EDID request signal, and also the television 200 is in a connectable state as to the video camera 100, the television 200 transmits the EDID to the video camera 100 via the DDC line 304.

In step S408, the CPU 101 determines whether or not the video camera 100 and the television 200 are connected, in accordance with a third connection detecting method.

The third connection detecting method is a method used for detecting connection between the video camera 100 and the television 200 depending on whether or not the EDID of the television 200 is received from the television 200 until a predetermined period of time elapses. The connection detecting unit 105 determines whether or not the EDID of the television 200 could have been received from the television 200 via the DDC line 304. The determination results of the connection detecting unit 105 are supplied to the CPU 101, whereby the CPU 101 can know whether or not the EDID of the television 200 could have been received. In a case where the EDID of the television 200 could have been received until a predetermined period of time elapses, the CPU 101 determines that the video camera 100 and the television 200 are connected. In a case where the EDID of the television 200 could not have been received until a predetermined period of time elapses, the CPU 101 determines that the video camera 100 and the television 200 are disconnected.

In a case where determination is made that the video camera 100 and the television 200 are connected (YES in step S408), the process proceeds to step S409 from step S408. In a case where determination is made that the video camera 100 and the television 200 are disconnected (NO in step S408), the process proceeds to step S413 from step S408.

In order to establish the HDMI connection between the video camera 100 and the television 200, in step S409 the CPU 101 supplies a TMDS enable signal to the TMDS driver 106a. The TMDS driver 106a which received the TMDS enable signal returns to a normal state from a low power consumption state, and enables the TMDS line 301. In a case where the TMDS line 301 has been enabled, the video camera 100 can transmit the video data, the audio data, and the auxiliary data to the television 200 via the TMDS line 301.

In order to establish the HDMI connection between the video camera 100 and the television 200, in step S410 the CPU 101 supplies a CEC enable signal to the CEC driver 106b. The CEC driver 106b which received the CEC enable signal returns to a normal state from a low power consumption state, and enables the CEC line 302. In a case where the CEC line 302 has been enabled, the video camera 100 can receive a CEC command used for controlling the video camera 100 from the television 200, and can also transmit a CEC command used for controlling the television 200 to the television 200.

Following the process in steps S409 and S410 being completed, the HDMI connection is established between the video camera 100 and the television 200. Upon the HDMI connection being established between the video camera 100 and the television 200, the video camera 100 and the television 200 become a connected state.

In step S411, the CPU 101 starts process used for transmitting the video data and so forth to the television 200 via the TMDS line 301.

In a case where the operation mode of the video camera 100 is the image capture mode, the video data generated from a captured video and audio data thereof are transmitted to the television 200 from the video camera 100 via the TMDS line 301. In a case where the operation mode of the video camera 100 is the playback mode, the menu screen used for selecting video data to be reproduced is transmitted from the video camera 100 to the television 200 via the TMDS line 301. Upon the user instructing the television 200 to select and reproduce video data by using the remote control unit 209, the television 200 transmits the CEC command corresponding to the instruction thereof to the video camera 100. The video camera 100 reproduces the video data selected by the user and the audio data thereof from the recording medium. The video data reproduced from the recording medium and the audio data thereof are transmitted from the video camera 100 to the television 200 via the TMDS line 301.

In step S412, the CPU 101 determines that the HDMI connection between the video camera 100 and the television 200 could have been established, and changes the value of the HDMI connection flag included in the RAM 102 to "1". In this case, the video camera 100 and the television 200 become a connected state. Subsequently, the process proceeds to step S303 in FIG. 3 from step S412.

In step S413, the CPU 101 determines that the HDMI connection between the video camera 100 and the television 200 could not have been established, and changes the value of the HDMI connection flag included in the RAM 102 to "0". In this case, the video camera 100 and the television 200 become an unconnected state. Subsequently, the process proceeds to step S303 in FIG. 3 from step S413.

Thus, the video camera 100 can select the first connecting process or second connecting process in accordance with the operation mode of the video camera 100, whereby suitable connecting process can be executed for each operation mode.

For example, in a case where the operation mode of the video camera 100 is the playback mode, the video camera 100 can detect whether or not the video camera 100 and the television 200 are connected according to one of the first through third connection detecting methods. Thus, the HDMI connection can be readily established between the video camera 100 and the television 200. Particularly, in a case where the operation mode of the video camera 100 is the playback mode, as compared to the case where the operation mode of the video camera 100 is the image capture mode, there is a high possibility that the video camera 100 is controlled remotely by the CEC command from the television 200. Establishment of the HDMI connection is facilitated between the video camera 100 and the television 200, whereby the number of occurrences in which the video camera 100 fails to be remotely controlled by the CEC command from the television 200 can be reduced.

Also, for example, in a case where the operation mode of the video camera 100 is the image capture mode, the video camera 100 can detect whether or not the video camera 100 and the television 200 are connected according to one of the first and second connection detecting methods. Thus, detection by the third connection detecting method can be omitted, whereby process executed by the video camera 100 can be reduced, and power consumption can be reduced.

Also, even in a case where the operation mode of the video camera 100 has been changed, in a case where HDMI connection has already been established between the video camera 100 and the television 200, the video camera 100 can prevent the HDMI connecting process in step S302 from being executed. Thus, the video camera 100 can rapidly resume transmission of video data to the television 200, and reception of the CEC command from the television 200. As a result thereof, the video camera 100 can smoothly execute change of the operation mode of the video camera 100.

Other Embodiments

The communication apparatus according to the present invention is not restricted to the communication apparatuses described in the first embodiment. For example, the communication apparatus according to the present invention may also be realized with a system configured of a plurality of apparatuses.

Also, the various types of process and functions described in the first embodiment may be realized with a computer program. In this case, the computer program according to the present invention is executed at a computer (including a CPU), thereby realizing the various types of process and functions described in the first embodiment.

It goes without saying that the various types of process and functions described in the first embodiment may be realized with the computer program according to the present invention by using the OS (Operating System) or the like running on the computer.

The computer program according to the present invention is read out from a computer readable storage medium, and is executed at the computer. As the computer readable storage medium a hard disk device, optical disc (CD-ROM, CD-R), memory card, or ROM may be used. Also, an arrangement may be made wherein the computer program according to the present invention is provided to the computer from an external apparatus via a communication interface, and is executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-188859 filed Jul. 22, 2008, which is hereby incorporated by reference herein in its entirety.

What is claimed is:

1. A communication apparatus comprising:
a reading unit that reads video data from a storage medium;
a transmitting unit that transmits video data, read from the storage medium by the reading unit, to a receiving apparatus via a predetermined line;
a first detecting unit that detects a level of a signal transmitted from the receiving apparatus to the communication apparatus;
a second detecting unit that detects a level of a termination voltage relating to the predetermined line;
an obtaining unit that obtains first information relating to the receiving apparatus from the receiving apparatus; and
a control unit that (a) executes a determination process for determining whether the communication apparatus and the receiving apparatus are connected if the communication apparatus is in a first mode, (b) stores second information indicating whether the communication apparatus and the receiving apparatus are connected after the determination process is performed, and (c) controls, based on the second information, a execution of the determination process after an instruction for changing the communication apparatus from the first mode to a second mode is inputted to the communication apparatus, wherein the determination process includes a process for determining, based on at least one of a detected result of the first detecting unit and a detected result of the second detecting unit, whether the communication apparatus and the receiving apparatus are connected, wherein the first mode is used for transmitting video data, read from the storage medium by the reading unit, to the receiving apparatus.

2. The communication apparatus according to claim 1, further comprising an image capture unit that generates, using an optical image of an object, captured video data, wherein the second mode is used for transmitting the captured video data, generated by the image capture unit, to the receiving apparatus.

3. The communication apparatus according to claim 1, wherein the control unit executes a process for determining, based on whether the first information is obtained from the receiving apparatus, whether the communication apparatus and the receiving apparatus are connected if the communication apparatus is in the first mode.

4. The communication apparatus according to claim 1, wherein the control unit does not execute the determination process if the second information indicates that the communication apparatus and the receiving apparatus are connected.

5. The communication apparatus according to claim 1, wherein the control unit executes the determination process if the second information indicates that the communication apparatus and the receiving apparatus are not connected.

6. The communication apparatus according to claim 1, wherein the control unit controls, based on the second information, the execution of the determination process after an instruction for changing the communication apparatus from the second mode to the first mode is inputted to the communication apparatus.

7. The communication apparatus according to claim 1, wherein the first information includes information indicating a capability of the receiving apparatus.

8. A method comprising:
reading video data from a storage medium;
transmitting video data, read from the storage medium, to a receiving apparatus via a predetermined line;
detecting a level of a signal transmitted from the receiving apparatus to a communication apparatus;
detecting a level of a termination voltage relating to the predetermined line;
obtaining first information relating to the receiving apparatus from the receiving apparatus;
executing a determination process for determining whether the communication apparatus and the receiving apparatus are connected if the communication apparatus is in a first mode, wherein the determination process includes a process for determining, based on at least one of the level of the signal and the level of the termination voltage, whether the communication apparatus and the receiving apparatus are connected, and the first mode is used for transmitting video data, read from the storage medium, to the receiving apparatus;
storing second information indicating whether the communication apparatus and the receiving apparatus are connected after the determination process is performed; and
controlling, based on the second information, an execution of the determination process after an instruction for changing the communication apparatus from the first mode to a second mode is inputted.

9. The method according to claim 8, further comprising executing a process for determining, based on whether the first information is obtained from the receiving apparatus, whether the communication apparatus and the receiving apparatus are connected if the communication apparatus is in the first mode.

10. The method according to claim 8, further comprising executing the determination process if the second information indicates that the communication apparatus and the receiving apparatus are not connected.

11. The method according to claim 8, further comprising controlling, based on the second information, the execution of the determination process after an instruction for changing the communication apparatus from the second mode to the first mode is inputted to the communication apparatus.

12. The method according to claim 8, wherein the first information includes information indicating a capability of the receiving apparatus.

13. A non-transitory computer-readable recording medium storing a program executed by a computer, wherein the program causes the computer to perform a method, the method comprising:
reading video data from a storage medium;
transmitting video data, read from the storage medium, to a receiving apparatus via a predetermined line;
detecting a level of a signal transmitted from the receiving apparatus to a communication apparatus;
detecting a level of a termination voltage relating to the predetermined line;
obtaining first information relating to the receiving apparatus from the receiving apparatus;
executing a determination process for determining whether the communication apparatus and the receiving apparatus are connected if the communication apparatus is in a first mode, wherein the determination process includes a process for determining, based on at least one of the level of the signal and the level of the termination voltage, whether the communication apparatus and the receiving apparatus are connected, and the first mode is used for transmitting video data, read from the storage medium, to the receiving apparatus;
storing second information indicating whether the communication apparatus and the receiving apparatus are connected after the determination process is performed, and
controlling, based on the second information, a execution of the determination process after an instruction for changing the communication apparatus from the first mode to a second mode is inputted.

14. The non-transitory computer-readable recording medium according to claim 13, further comprising executing a process for determining, based on whether the first information is obtained from the receiving apparatus, whether the communication apparatus and the receiving apparatus are connected if the communication apparatus is in the first mode.

15. The non-transitory computer-readable recording medium according to claim 13, further comprising executing the determination process if the second information indicates that the communication apparatus and the receiving apparatus are not connected.

16. The non-transitory computer-readable recording medium according to claim 13, further comprising controlling, based on the second information, the execution of the determination process after an instruction for changing the communication apparatus from the second mode to the first mode is inputted to the communication apparatus.

17. The non-transitory computer-readable recording medium according to claim 13, wherein the first information includes information indicating a capability of the receiving apparatus.

* * * * *